United States Patent [19]
Horovitz

[11] Patent Number: 5,978,089
[45] Date of Patent: Nov. 2, 1999

[54] NON-CONTACT METHOD FOR MEASURING THE SHAPE OF AN OBJECT

[75] Inventor: Gabi Horovitz, Yishuv Kornit, Israel

[73] Assignee: Nextel Ltd., Haifa, Israel

[21] Appl. No.: 08/843,367

[22] Filed: Apr. 15, 1997

[51] Int. Cl.⁶ ............................. G01B 11/14; G01B 11/24
[52] U.S. Cl. ............................................ 356/376; 356/375
[58] Field of Search ................................... 356/375, 376, 356/241, 4.03

[56] References Cited

U.S. PATENT DOCUMENTS

| | | |
|---|---|---|
| 3,016,464 | 1/1962 | Bailey . |
| 3,523,736 | 8/1970 | Bottomley ................................ 356/378 |
| 3,667,846 | 6/1972 | Nater et al. . |
| 3,835,249 | 9/1974 | Dattilo et al. . |
| 3,866,038 | 2/1975 | Korth . |
| 3,976,382 | 8/1976 | Westby . |
| 3,986,774 | 10/1976 | Lowrey, Jr. et al. . |
| 4,171,917 | 10/1979 | Pirlet . |
| 4,331,975 | 5/1982 | Krawza et al. .......................... 358/100 |
| 4,373,804 | 2/1983 | Pryor et al. . |
| 4,548,504 | 10/1985 | Morander ................................ 356/376 |
| 4,627,734 | 12/1986 | Rioux . |
| 4,708,483 | 11/1987 | Lorenz .................................... 356/375 |
| 4,712,916 | 12/1987 | Gunn ....................................... 356/241 |
| 4,874,246 | 10/1989 | Den Boef ................................ 356/375 |
| 4,936,676 | 6/1990 | Stauffer ................................... 356/375 |
| 4,963,018 | 10/1990 | West ........................................ 356/241 |
| 5,067,817 | 11/1991 | Glenn . |
| 5,097,119 | 3/1992 | Breitmeier ............................... 356/376 |
| 5,111,056 | 5/1992 | Yoshimura et al. . |
| 5,168,327 | 12/1992 | Yamawaki ............................... 356/376 |
| 5,177,556 | 1/1993 | Rioux . |
| 5,260,761 | 11/1993 | Barker . |
| 5,612,785 | 3/1997 | Boillot et al. ........................... 356/375 |

FOREIGN PATENT DOCUMENTS

| | | |
|---|---|---|
| 3507 445 A1 | 4/1990 | Germany . |
| 3840820 | 6/1990 | Germany ............................... 356/376 |

OTHER PUBLICATIONS

Best, P.J., "Active, Optical Range Imaging Sensors", *Machine Visions and Applications,* (1988) 1:127–52.

*Primary Examiner*—Frank G. Font
*Assistant Examiner*—Zandra V. Smith
*Attorney, Agent, or Firm*—Mark M. Friedman

[57] ABSTRACT

An improved method for measuring the shape of a workpiece, and an associated device. The invention has three aspects. The first aspect of the invention is a triangulation device that creates an annular image whose diameter is a linear function of the distance from the device to the workpiece. According to the second aspect of the invention, the shape of a concave or reentrant workpiece is measured by folding the path of the incident light using a reflector inserted into the workpiece, so that light is reflected from the otherwise inaccessible interior walls of the workpiece. According to the third aspect of the invention, the incident beam of light is provided with a structured cross section.

23 Claims, 10 Drawing Sheets

NON-CONTACT METHOD FOR MEASURING THE SHAPE OF AN OBJECT

FIELD AND BACKGROUND OF THE INVENTION

The present invention relates to non-contact measurement of the shape of an object, and, more particularly, to an optical method and device for measuring the shape of an object by triangulation.

Triangulation has long been used to measure surface profiles. Representative patents in the field include those of Korth (U.S. Pat. No. 3,866,038), Lowrey, Jr. et al. (U.S. Pat. No. 3,986,774), Pryor et al. (U.S. Pat. No. 4,373,804), Rioux (U.S. Pat. Nos. 4,627,734, 4,645,347 and 5,177,556) and Yoshimura et al. (U.S. Pat. No. 5,111,056). Triangulation devices, for example the device of Lowrey et al., commonly are used for quality control in manufacturing, to verify that the workpieces being manufactured have the correct shapes.

Figure 1:
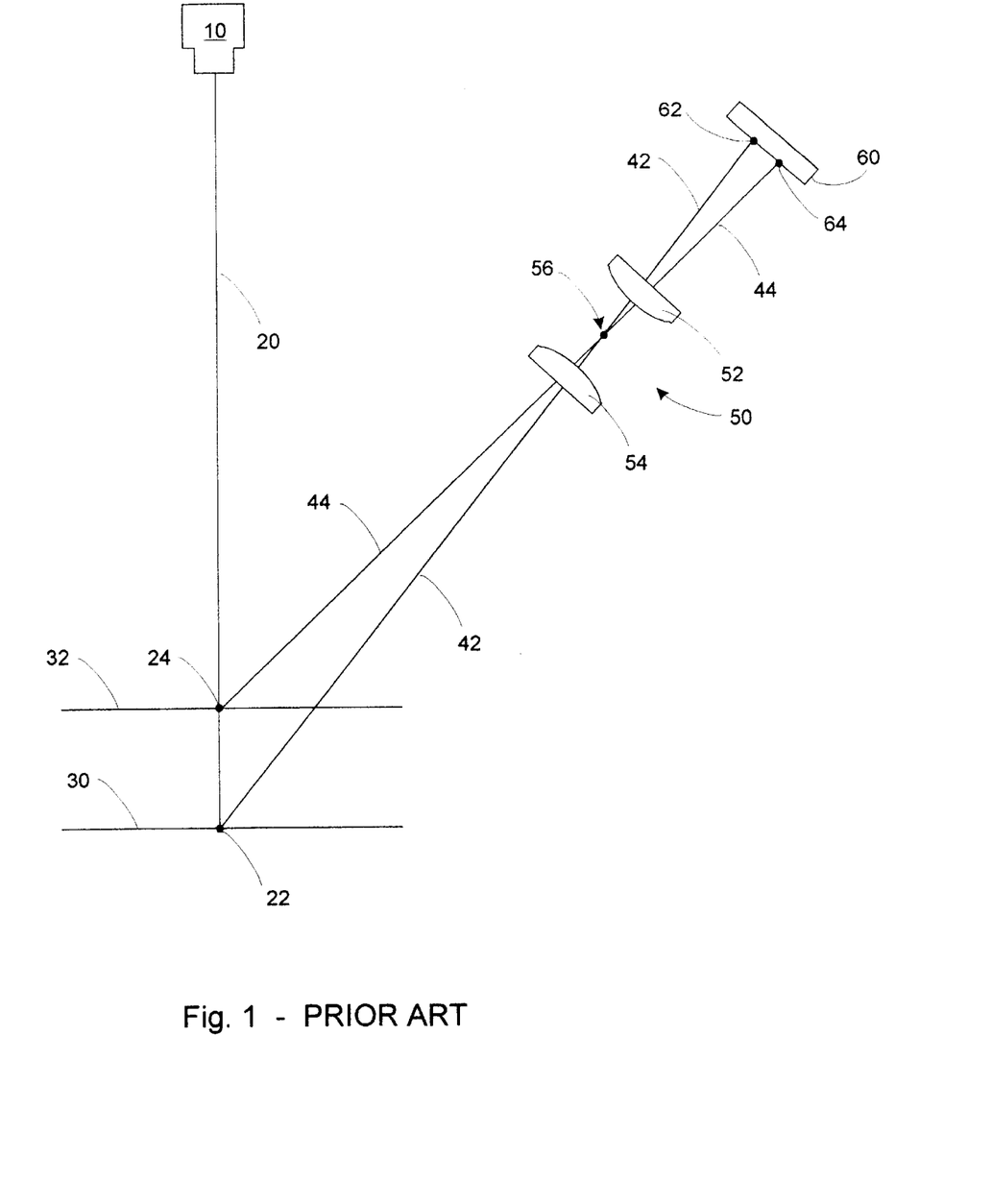
FIG. 1 (prior art) is a schematic diagram of the operation of a typical prior art triangulation device.

FIG. 1 shows schematically a typical triangulation device. A light source 10 shines an incident beam 20 of light on a workpiece whose distance along beam 20 from light source 10 is to be determined. FIG. 1A shows two workpieces, 30 and 32, at two different distances from light source 10. Preferably, a means is provided for ensuring that beam 20 illuminates only a small part of workpiece 30 or 32. This can be done by providing an optical system (not shown) for collimating beam 20, or for focusing beam 20 on workpiece 30 or 32. The incident light is reflected diffusely in all directions from a small spot 22 on workpiece 30, or from a small spot 24 on workpiece 32. Some of that reflected light is intercepted by an optical system 50 that is represented in FIG. 1 as two lenses 52 and 54. Optical system 50 focuses the intercepted light on a sensor 60 that is responsive to the position at which the intercepted light is focused thereupon. Typically, sensor 60 is a one dimensional array of charge coupled detectors. Optical system 50 is characterized by a theoretical focal point 56: all the light entering optical system 50 from a point along beam 20 strikes a point on array 60 determined by tracing a straight ray from the point along beam 20 through focal point 56. In FIG. 1, a ray 42 extends from spot 22 via focal point 56 to a point 62 on array 60, and a ray 44 extends from spot 24 via focal point 56 to a point 64 on array 60. Thus, all of the light diffusely reflected from spot 22 that is intercepted by optical system 50 strikes sensor 60 at or near point 62, and all of the light diffusely reflected from spot 24 that is intercepted by optical system 50 strikes sensor 60 at or near point 64. It follows that the distance of a workpiece from light source 10 is a linear function of the position along sensor 60 at which light diffusely reflected from the workpiece is focused by optical system 50.

Spots 22 and 24 are not point light sources. Therefore their focused images on sensor 60 are not geometric points. Typically, the images of spots focused on sensor 60 are spread over several pixels of sensor 60, and the point on sensor 60 used to infer the distance to the workpiece is the center of gravity of the measured intensity.

Triangulation by this method suffers from several deficiencies. One is that the numerical aperture of optical system 50 is small relative to the amount of light reflected from the workpiece, so most of the reflected light is wasted. Another is that the measurement becomes increasingly difficult and imprecise as the surface of the workpiece departs from perpendicularity to incident beam 20. If the surface is nearly parallel to incident beam 20, the intensity of the light reflected diffusely towards optical system 50 is very low relative to the intensity reflected in the specular direction. Furthermore, the focused image on sensor 60 is spread out further, by an amount proportional to the secant of the angle between incident beam 20 and the surface. This degrades the accuracy of the measurement. If the surface is truly parallel to incident beam 20, as is the case for interior walls 35 and 36 of workpiece 34 of FIG. 2A, or if the surface is reentrant, as is the case for workpiece 38 of FIG. 2B, the distance to the surface cannot be measured at all.

Figure 3:
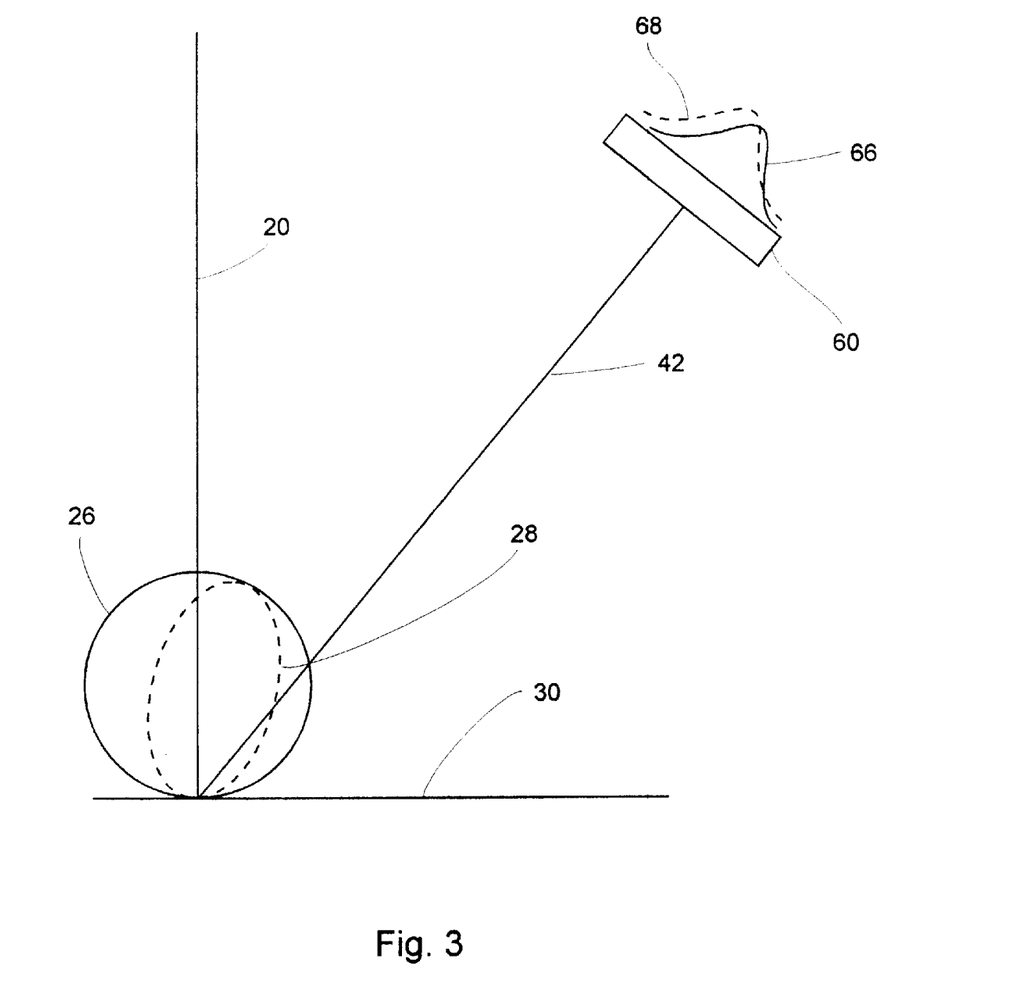
FIG. 3 illustrates the systematic error introduced by a non-Lambertian reflectivity profile into distance measurements performed using the device of FIG. 1.

A third deficiency relates to the surface roughness of the workpiece. If the tilt of the surface relative to incident beam 20 varies substantially within the spot created by incident beam 20 on the surface, then the intensity of the light reflected diffusely towards optical system 50 is not uniform across the spot, so the center of gravity of the measured intensity is displaced from where it would be if the intensity were uniform, leading to an erroneous distance estimate. Similarly, if the reflectivity profile of the surface is not Lambertian, then the center of gravity of the measured intensity is displaced in a way that leads to a systematic error in the distance estimate. This is illustrated in FIG. 3 for workpiece 30: a Lambertian reflectivity profile 26 produces an image having a symmetrical intensity profile 66 on sensor 60, whereas a non-Lambertian reflectivity profile 28 produces an image having an asymmetric intensity profile 68 on sensor 60. FIG. 3 shows workpiece 30 perpendicular to incident beam 20; the problem illustrated is even more severe for surfaces that are tilted with respect to incident beam 20.

There is thus a widely recognized need for, and it would be highly advantageous to have, a triangulation method that overcomes the deficiencies listed above of the prior art methods.

SUMMARY OF THE INVENTION

According to the present invention there is provided a device for measuring a distance to a workpiece, including: (a) a mechanism for creating an illuminated spot on the workpiece, the illuminated spot emitting diffusely reflected light; (b) a two dimensional detector array; and (c) a mechanism for focusing at least a portion of the diffusely reflected light on the two dimensional detector array as an annular image.

According to the present invention there is provided a method for measuring a distance to a workpiece, including: (a) providing a measuring device including: (i) a mechanism for creating an illuminated spot on the workpiece, the illuminated spot emitting diffusely reflected light, (ii) a two dimensional detector array, and (iii) a mechanism for focusing at least a portion of the diffusely reflected light on the two dimensional detector array as an annular image: and (b) determining a diameter of the annular image.

According to the present invention there is provided a method for measuring the dimensions of a cavity of a workpiece, the cavity being bounded by at least one wall, the method including the steps of: (a) inserting a reflector into the cavity; (b) directing an incident beam of light at the reflector, thereby providing a reflected beam of light directed at the wall, the reflected light being further reflected from a spot having a position on the wall back to the reflector, and from the reflector out of the cavity; (c) intercepting the reflected light at an interception point having a position outside of the cavity; and (d) inferring the position of the spot.

According to the present invention there is provided an improved method of measuring a distance to a workpiece by triangulation, wherein light reflected diffusely from an illuminated spot on a workpiece is focused as an image having a position on a detector, the improvement including the steps of: (a) providing the illuminated spot with a structure; and (b) deconvolving the structure from the image, thereby providing an improved estimate of the position of the image.

The present invention has three aspects each of which addresses one or more of the limitations listed above.

The first aspect of the present invention is directed at increasing the numerical aperture of the optical system. The basic idea is to extend optical system 50 and sensor 60 of FIG. 1 dimensionally by rotating them about an axis of rotation defined by incident beam 20, so that the resulting optical system intercepts diffusely reflected light all the way around a cone of revolution, and not just along a small portion of that cone. As is shown below, the resulting detector of the present invention need not be frustroconical, as would be obtained by a naive rotation of sensor 60 about incident beam 20, but preferably is a planar array of photodetectors.

The essence of the second aspect of the present invention is the placement of a mirror inside a concavity of the workpiece, to fold the optical paths traversed by the incident and reflected light so that the interior walls of the workpiece are accessible to the triangulation device. Many prior art triangulation devices, for example those of Rioux and of Yoshimura et al., use mirrors outside the workpiece to fold the optical path, but none place a mirror inside the workpiece. Hietanen et al., in U.S. Pat. No. 3,749.496, describe an apparatus for measuring the surface quality of the interior of a brake cylinder, in which a mirror is inserted into the brake cylinder to deflect an inspecting beam of light that enters the brake cylinder substantially along its axis of symmetry, so that the inspecting beam is reflected off the interior wall of the brake cylinder-and then backwards along the incoming path. It is not readily apparent from the design of that apparatus that inserting a mirror into a workpiece has any utility for triangulation, notably because the incident and reflected paths are preferably coincident, or at least parallel, a situation which makes triangulation geometrically impossible because coincident rays "intersect" everywhere and parallel rays never intersect, so that a unique intersection point of the incident and reflected paths cannot be defined.

The third aspect of the present invention is directed at obtaining a more accurate measurement of distance to the workpiece by illuminating a structured spot. Preferably, the illuminating light is incoherent and/or multichromatic (i.e., not monochromatic). As will be illustrated below, an image of a structured spot contains more information than an image of an unstructured spot. By sampling a wider portion of the surface of the workpiece, a structured spot also tends to compensate for local irregularities like surface roughness.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a triangulation device and method that can be used to accurately measure distances to workpieces with rough or non-Lambertian surfaces, as well as the interior dimensions of workpieces.

The principles and operation of a triangulation device and method according to the present invention may be better understood with reference to the drawings and the accompanying description.

Figure 4:
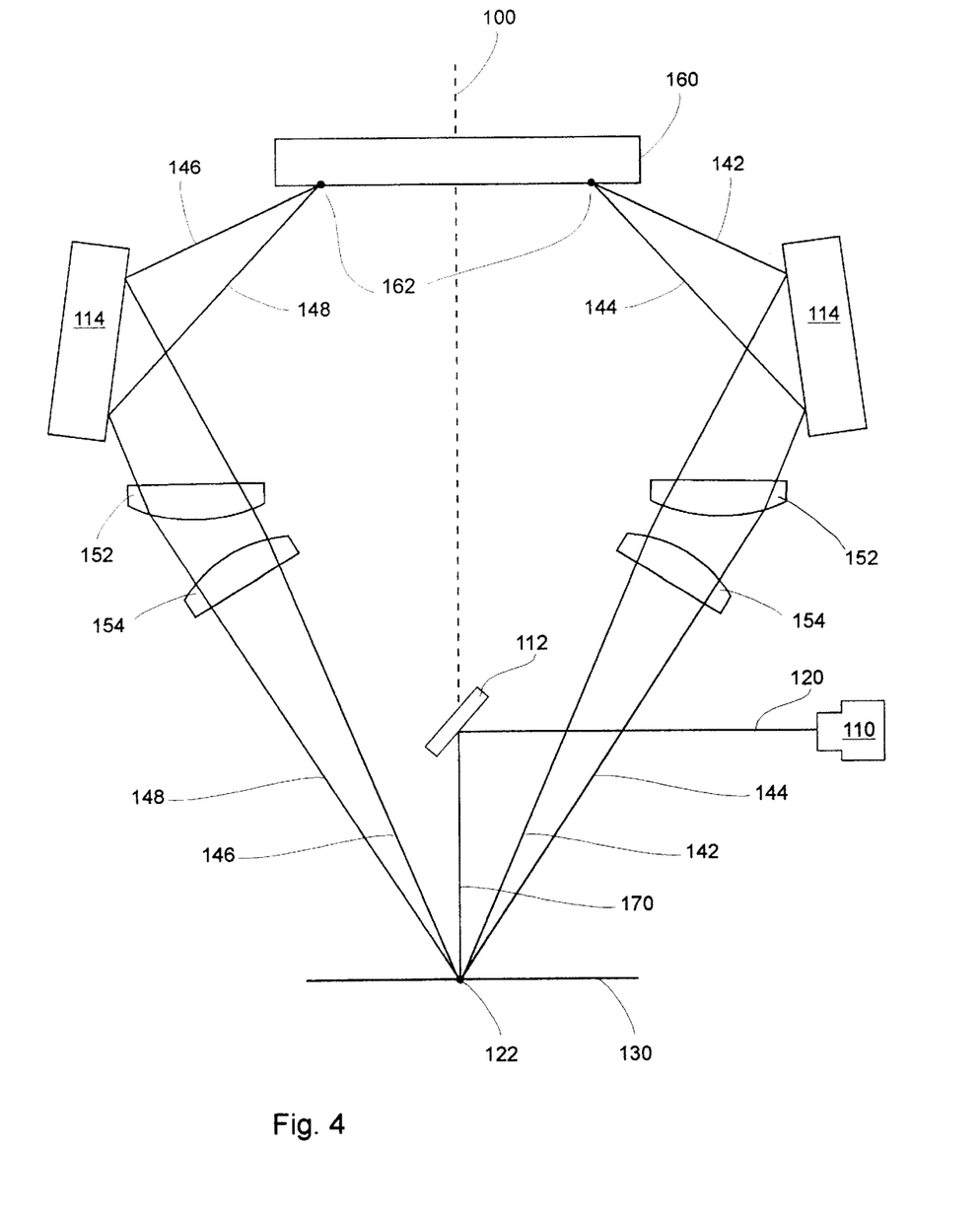
FIG. 4 is a schematic cross section through one embodiment of a device according to the first aspect of the present invention.

Referring now to the drawings, FIG. 4 shows, in schematic cross section, a first preferred embodiment of a device for implementing the first aspect of the present invention. Lenses 52 and 54 of FIG. 1 have been extended by rotation around a rotational axis of symmetry 100 to produce toroidal lenses 152 and 154. In other words, lenses 152 and 154 are bodies of revolution created by rotating lenses 52 and 54 about axis 100. Rather than extend flat sensor 60 by rotation around axis 100 to produce a frustoconical array, a mirror 114, having the shape of the frustrum of a cone whose axis of symmetry coincides with axis 100, is provided to fold the rays of light that are diffusely reflected from a workpiece 122 so that those rays strike a flat two dimensional detector array 160. Thus, axis 100 is an axis of symmetry of the device as a whole: lenses 152 and 154, as well as mirror 114, are disposed concentrically with axis 100. A light source 110 and a flat mirror 112 are provided to direct an incident beam 120 of light on workpiece 130. Incident beam 120 creates a luminous spot 122 on the surface of workpiece 130. Four diffusely reflected rays 142, 144, 146 and 148 are shown emerging from spot 122. Rays 142, 144, 146 and 148 are focused by lenses 152 and 154, and reflected by mirror 114, to strike array 160 at two spots 162. Spots 162 represent a cross section through an annular image of diffusely reflected light that is focused by lenses 142 and 154 onto array 160. The diameter of the annular image is proportional to the distance of workpiece 130 from array 160.

Figure 5:
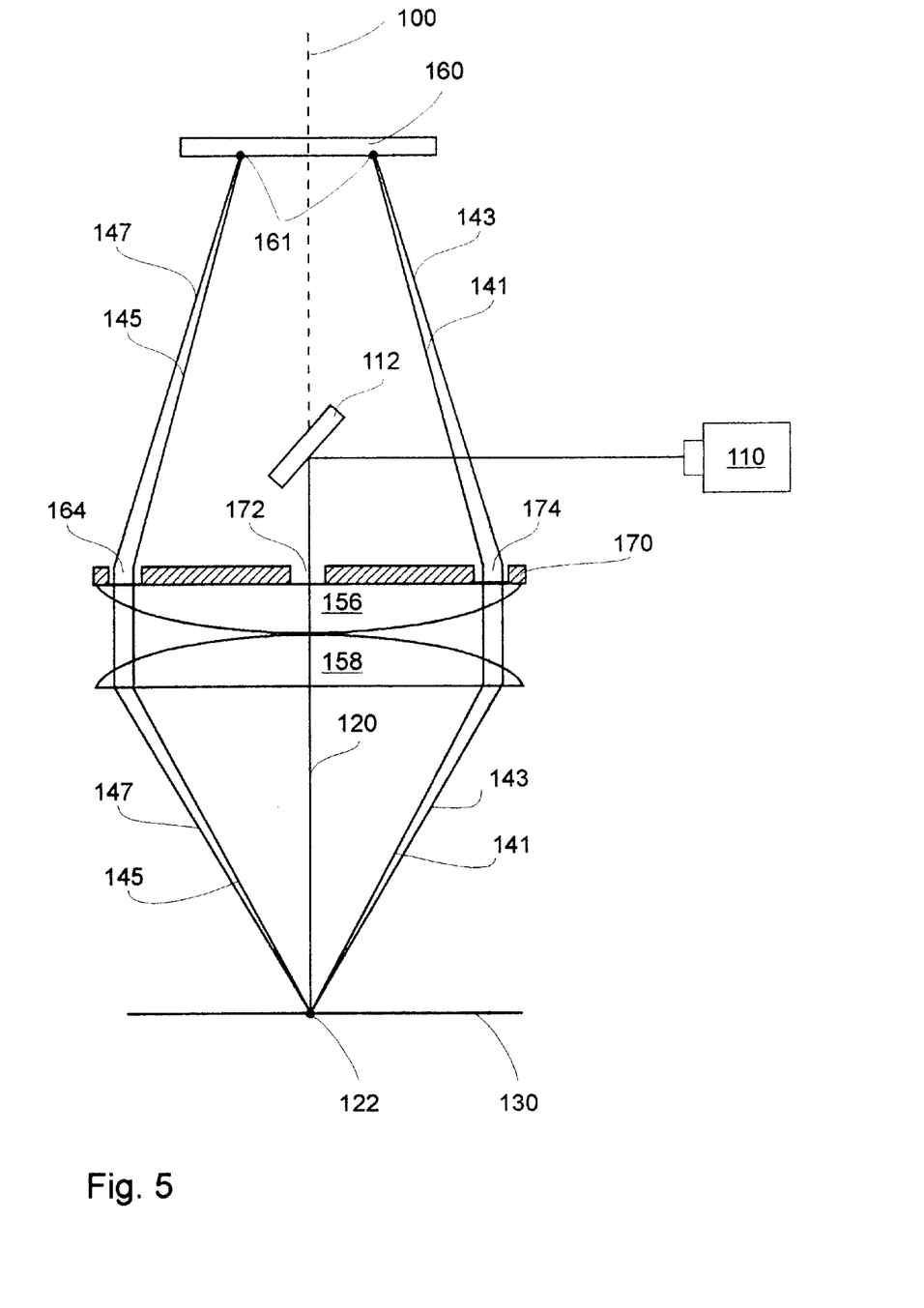
FIG. 5 is a schematic cross section through a second embodiment of a device according to the first aspect of the present invention.

FIG. 5 shows, also in schematic cross section, a second preferred embodiment of a device for implementing the first aspect of the present invention. The device of FIG. 5 is similar to the device of FIG. 4 except that, instead of toroidal lenses 152 and 154 and mirror 114, the device of FIG. 5 is provided with two half-convex spherical lenses 156 and 158 to focus diffusely reflected light from spot 122, represented by rays 141, 143, 145 and 147, to an annular image, represented by spots 161, on array 160. The device of FIG. 5 also is provided with a disc-shaped diaphragm 170 that has a central aperture 172 to admit incident beam 120 from light source 110, and that also has an annular aperture 164 dimensioned to select diffusely reflected light from spot 122 in accordance with the range of distances to workpiece 130 to be measured, as described in M. Born and E. Wolf, *Principles of Optics* (Pergamon Press, 4th Edition, 1970) Section 8.5, pp. 392–400. Lenses 156 and 158, as well as diaphragm 170, are disposed concentrically with axis of symmetry 100.

Just as the prior art focused images are not geometric points, so the annular image of the present invention is not a geometric circle, but is spread over an annular region. The analog of the prior art center of gravity computation to obtain a unique average diameter of the annular image, is a weighted average of radius r, in a polar (r,θ) coordinate system, on array 160, having its origin on axis 100, the weights being proportional to the intensity of the image. The diameter of the annular image is twice this average r.

The devices of FIGS. 4 and 5 have a much larger numerical aperture than the prior art device of FIG. 1, and therefore can be used to measure the shapes of workpieces of much lower reflectivity than can be measured using the device of FIG. 1. Furthermore, the area of the annular image on array 160 is much larger than the area of the corresponding focused spot image on array 60. Therefore, the computation of the diameter of the annular image on array 160 is based on many more data points than the computation of the center of gravity of the focused spot image on array 60. As a result, shapes are measured much more accurately using the devices of FIGS. 4 and 5 than using the device of FIG. 1.

Figure 2A:
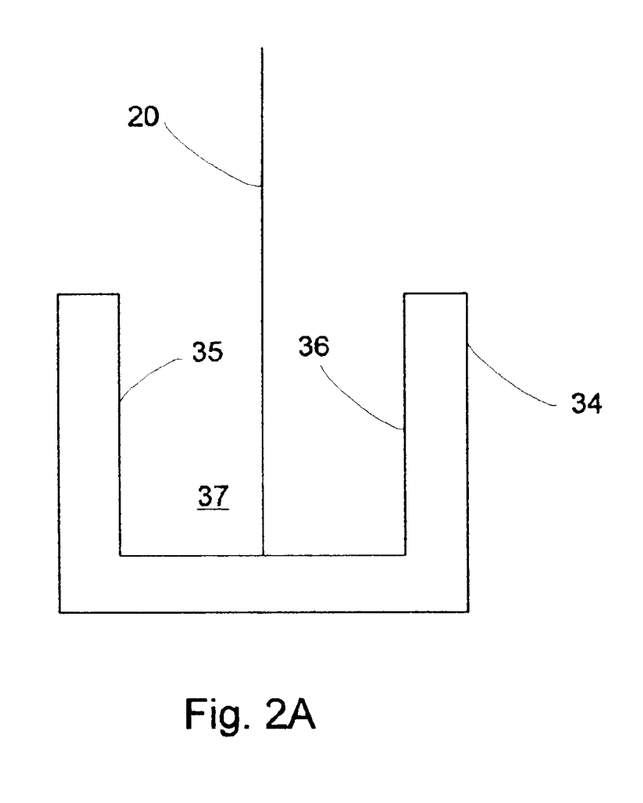
FIG. 2A is a schematic cross-sectional view of a concave workpiece with interior walls that are parallel to an incident beam of light.
Figure 2B:
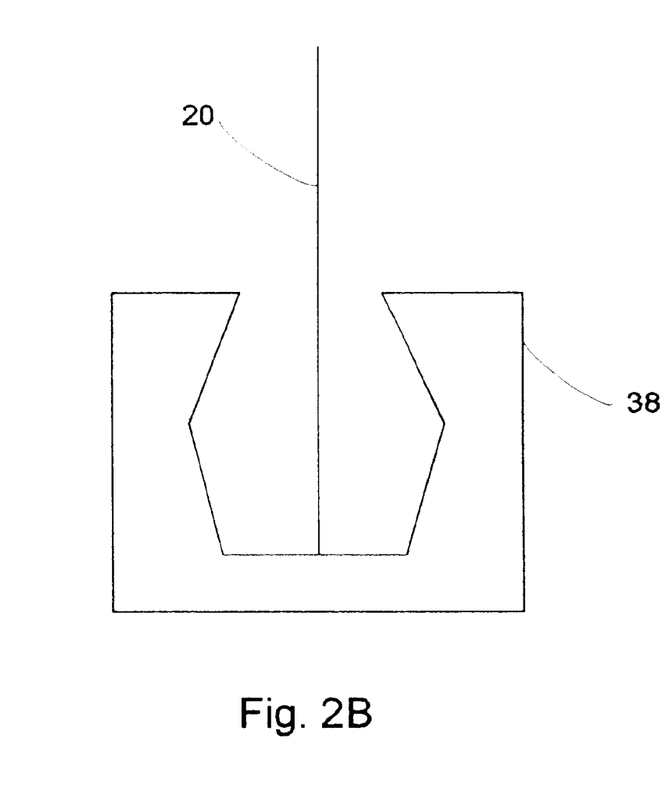
FIG. 2B is a schematic cross-sectional view of a concave workpiece with reentrant interior walls.
Figure 6:
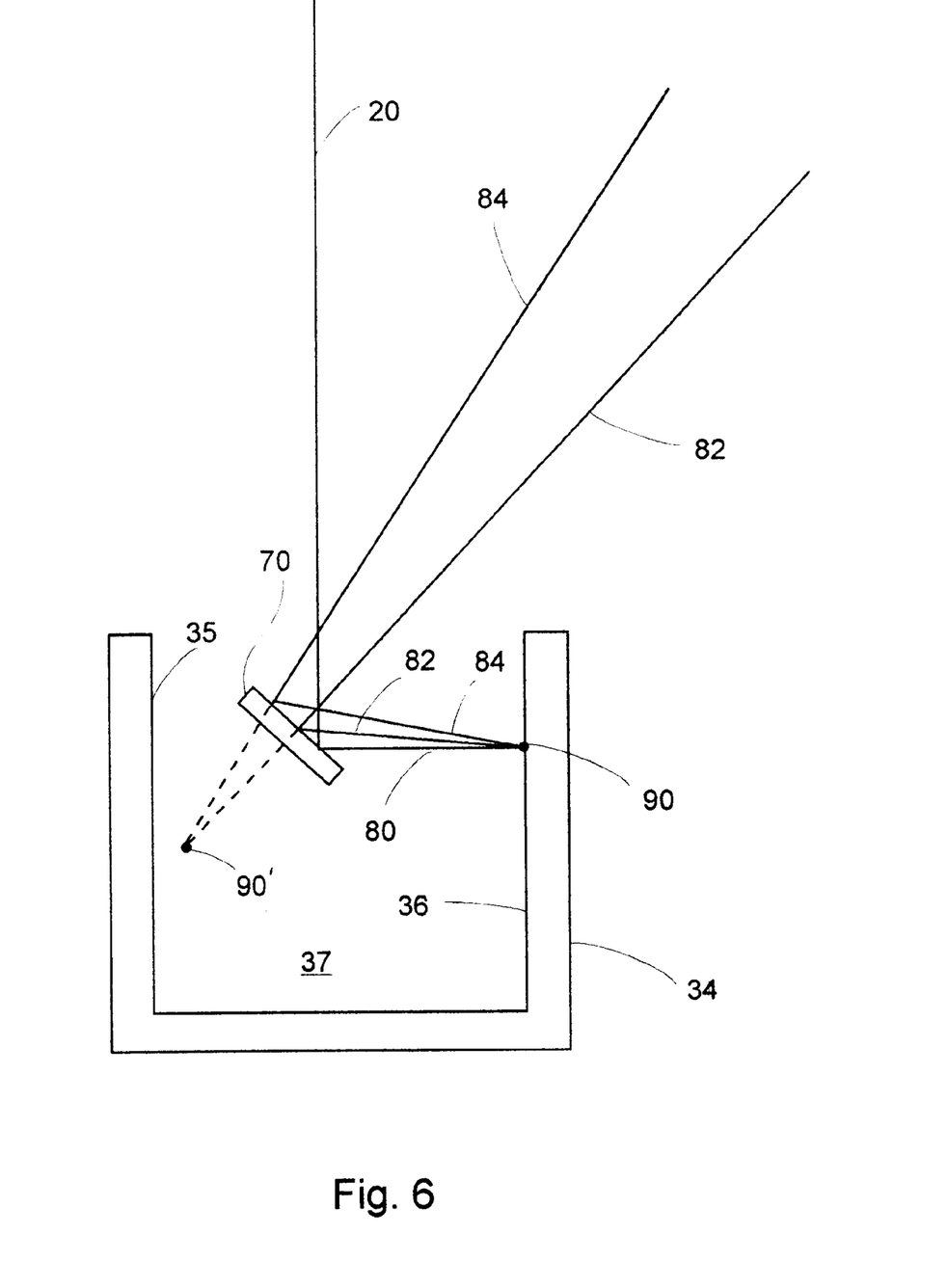
FIG. 6 is a partial schematic diagram of the device of FIG. 1 modified according to the first aspect of the present invention to measure the interior dimensions of the workpiece of FIG. 2.

FIG. 6 is a partial schematic illustration of the device of FIG. 1 modified according to the principles of the second aspect of the present invention to measure the interior dimensions of workpiece 34 of FIG. 2A. A flat reflector represented here by a mirror 70, is placed inside cavity 37 of workpiece 34 so that incident beam 20 is reflected specularly off of mirror 70 as a reflected beam 80 towards interior wall 36. Reflected beam 80 impinges on wall 36 in a spot 90. Light is reflected diffusely from spot 90 along an infinite number of rays, two of which, rays 82 and 84, are partially illustrated in FIG. 6. Rays 82 and 84 are reflected specularly off of mirror 70 towards optical system 50. Conventional triangulation locates spot 90 at the intersection point of continuations of rays 82 and 84 behind mirror 70. This intersection point is designated in FIG. 6 by the reference numeral 90'. Given the location of the front (reflecting) surface of mirror 70, a simple geometric transformation transforms point 90' into a point in spot 90, providing the location of spot 90.

Although the reflector of the present invention is represented in FIG. 6 as mirror 70, it can be any suitable reflective optical component, such as a prism. The simplest way to compute the location of spot 90 is to trace a straight ray from the center of gravity of the image of spot 90 on array 60 via focal point 56 to mirror 70, and to trace a specularly reflected continuation of the ray from mirror 70 to the intersection of the continuation of the ray with reflected beam 80.

Figure 7A:
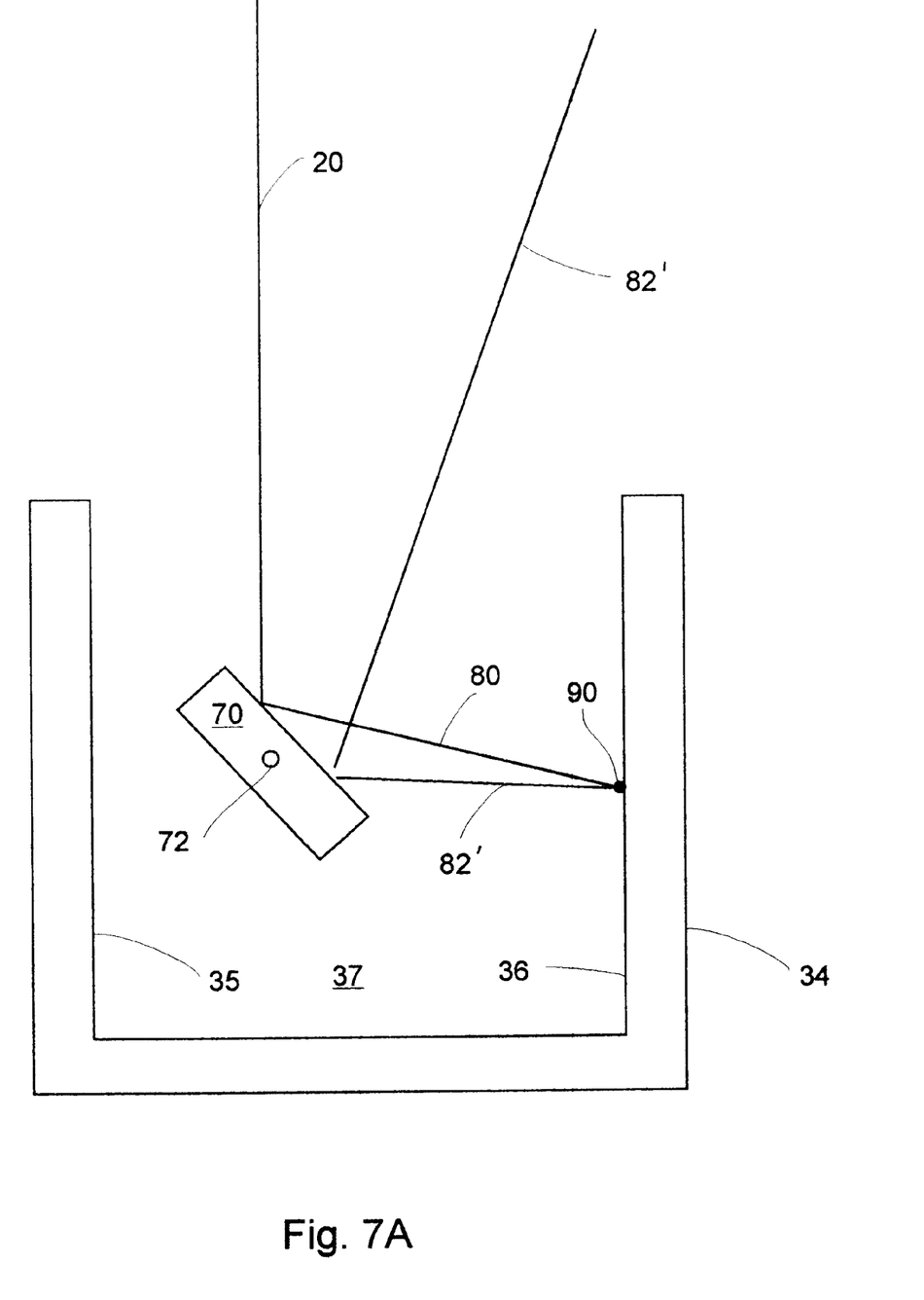
FIG. 7A illustrates scanning the interior walls of the workpiece of FIG. 6 by rotating the mirror of FIG. 6 about an axis perpendicular to the incident beam.
Figure 7B:
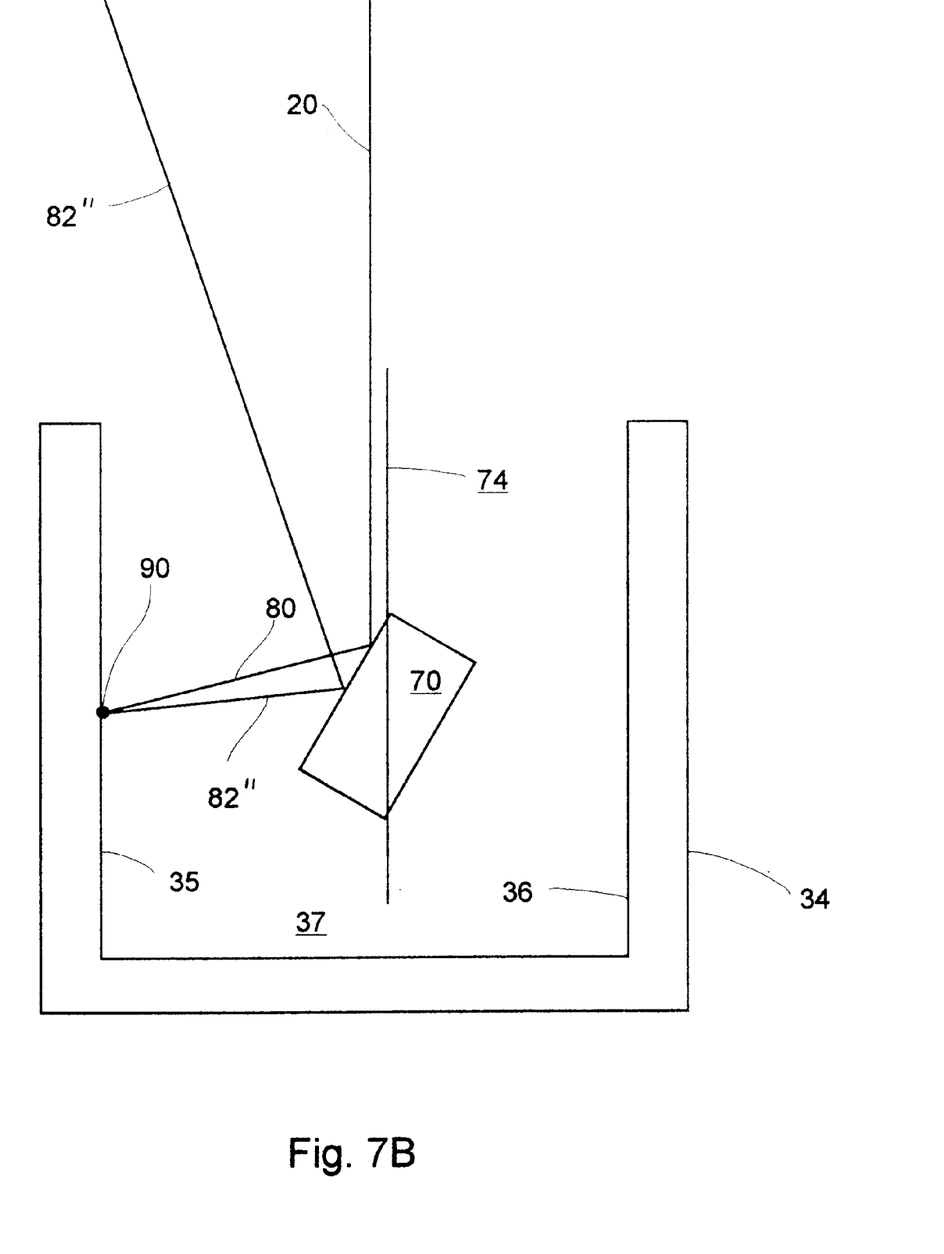
FIG. 7B illustrates scanning the interior walls of the workpiece of FIG. 6 by rotating the mirror of FIG. 6 about an axis parallel to the incident beam.

Preferably, mirror 70 is moved to direct reflected beam 80 at many points on the interior walls of workpiece 34, thereby scanning the interior walls of workpiece 34. Translating mirror 70 parallel to incident beam 20 in FIG. 6 causes spot 90 to move up and down interior wall 36. Rotating mirror 70 about an axis 72 that is perpendicular to incident beam 20, as shown in FIG. 7A, in which axis 72 emerges from the plane of the Figure, also causes spot 90 to move up and down interior wall 36. One light ray reflected diffusely from spot 90 is designated in FIG. 7A by reference numeral 82'. Note that, in contrast to the situation in FIG. 6, in which diffusely reflected rays 82 and 84 are above reflected beam 80, in FIG. 7A, because mirror 70 has been rotated clockwise about axis 72, spot 90 is lower than the point at which incident beam 20 strikes mirror 70, so that diffusely reflected ray 82' is below reflected beam 80. Rotating mirror 70 about an axis 74 that is substantially parallel to incident beam 20, as shown in FIG. 7B, causes spot 90 to move sideways around the interior walls of workpiece 34: In FIG. 7B, mirror 70 has been rotated 180° about axis 74, so that spot 90 now is on interior wall 35. Again, one light ray reflected diffusely from spot 90 is designated in FIG. 7B by reference numeral 82". Obviously, optical system 50 and detector 60 must be moved along with mirror 70, or a second optical system and detector must be provided, to intercept ray 82".

Alternatively, workpiece 34 may be translated and rotated to effect a scanning of the interior walls of workpiece 34. Translating workpiece 34 parallel to incident beam 20 in FIG. 7A causes spot 90 to move up and down interior wall 36. Rotating workpiece 34 about axis 74 of FIG. 7B causes spot 90 to move sideways around the interior walls of workpiece 34, with no need to move detector 60 and optical system 50, or to provide a second detector and optical system.

Although the method of the present invention is illustrated herein as applied to workpiece 34 whose interior walls are parallel to incident beam 20, it will be clear from the description herein to one ordinarily skilled in the art how to apply the principles of the present invention to measure the interior dimensions of reentrant workpiece 38, or indeed of any other concave workpiece.

Figure 8A:
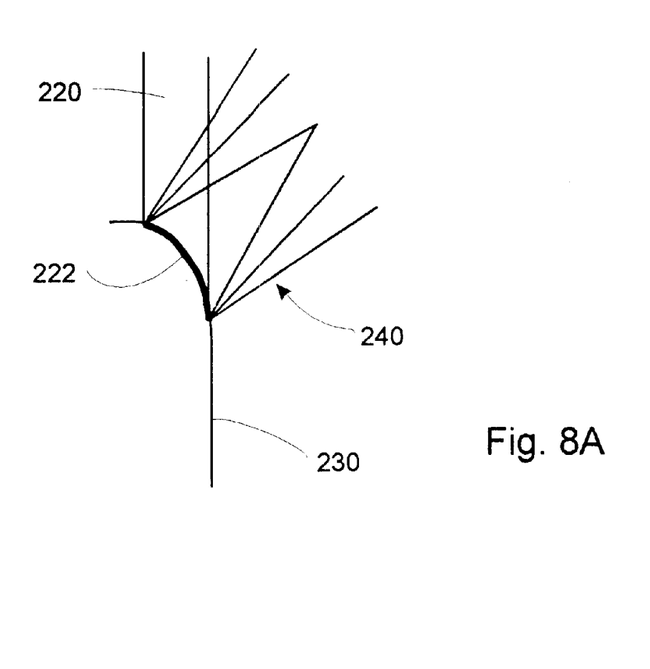
FIG. 8A illustrates the diffuse reflection of light from a spot on a workpiece that is concave downward.
Figure 8B:
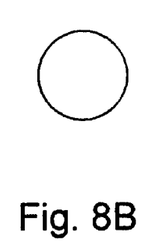
FIG. 8B shows the circular cross section of the incident beam of FIG. 8A.
Figure 8C:
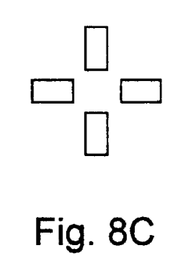
FIG. 8C shows a structured cross section for the incident beam of FIG. 8A.
Figure 8D:
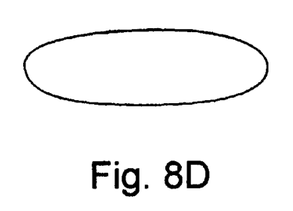
FIG. 8D shows the shape of the focused image of the luminous spot of FIG. 8A when the incident beam has the circular cross section of FIG. 8B.
Figure 8E:
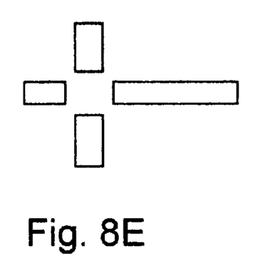
FIG. 8E shows the shape of the focused image of the luminous spot of FIG. 8A when the incident beam has the structured cross section of FIG. 8C.

FIGS. 8A, 8B, 8C, 8D and 8E illustrate how the third aspect of the present invention improves the accuracy of the estimation of the location of a focused image of diffusely reflected light on a two dimensional detector array, and so increases the accuracy with which distances are measured by triangulation using, for example, the device of FIG. 1 and similar devices. In FIG. 8A, a beam 220 of light is directed at a workpiece 230 which is concave downward, creating a luminous spot 222 from which emerges diffusely reflected light 240. Note that beam 220 has a finite width. Diffusely reflected light is focused by an optical system such as optical system 50 on a detector array such as array 60. According to the prior art, beam 220 has a substantially circular cross section, as shown in FIG. 8B. Because workpiece 230 is concave downward, the corresponding focused image, shown in FIG. 8D, is smeared, and an estimate of its center of gravity is biased to the right, producing, in the geometry of FIG. 1, a distance estimate that is too low. According to the third aspect of the present invention, beam 220 is provided with a structured cross section, such as the cruciform cross section of FIG. 8C. The corresponding focused image is shown in FIG. 8E. It is intuitively clear that a distance estimate based on the intersection point of the arms of the cross in FIG. 8E is more accurate than a distance estimate based on the image of FIG. 8D. Mathematically, the position in the image from which to launch a ray towards the focal point of the imaging optical system (as described above in the context of FIG. 1) is determined by deconvolving the structure of incident beam 220 from the focused image.

Figure 9:
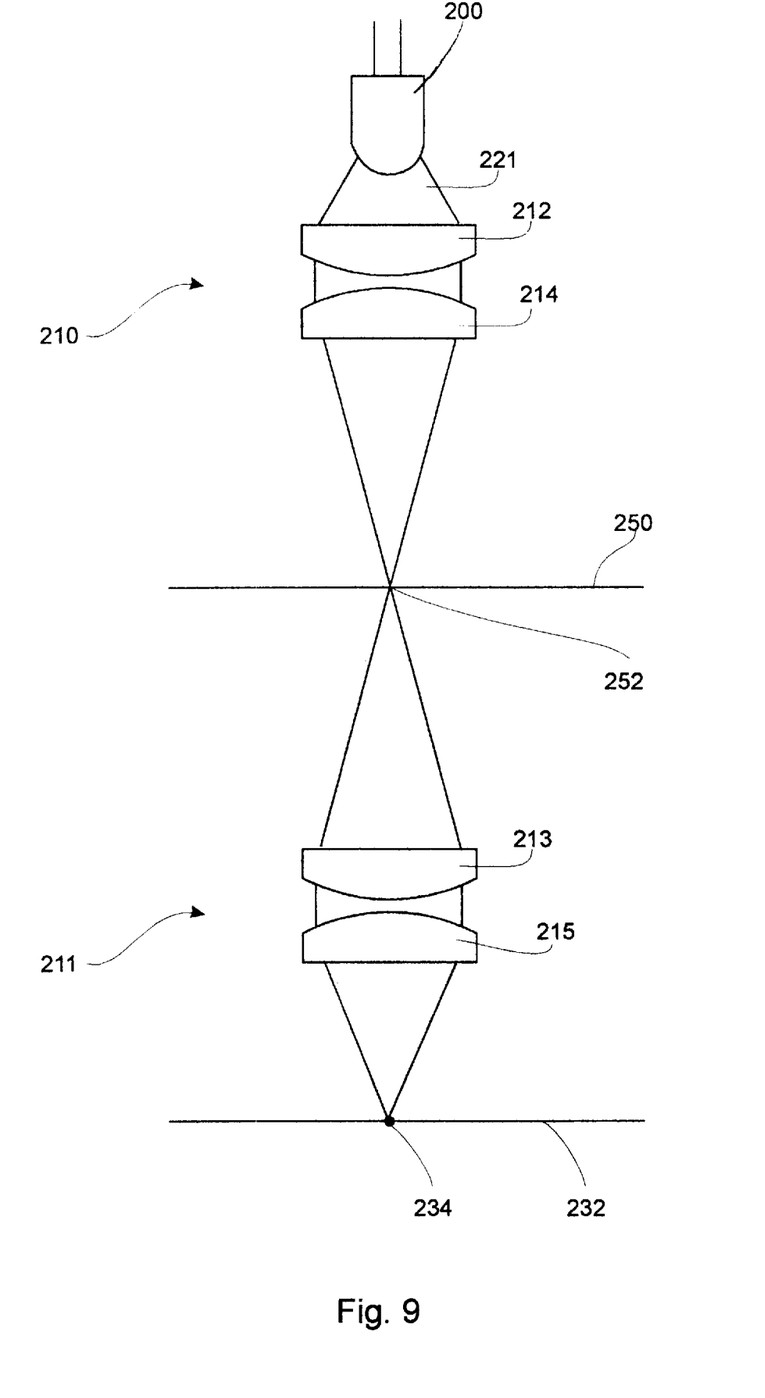
FIG. 9 is a schematic cross section of a device for providing a structured illumination beam.

FIG. 9 shows a schematic cross section of a device for providing a structured illumination beam. The device includes a source 200 of light 221, two focusing mechanisms 210 and 211, and a mask 250 having an aperture 252. Focusing mechanism 210 focuses light 221 on aperture 252. Focusing mechanism 211 focuses light 221 emerging from aperture 252 onto a workpiece 232, forming a structured luminous spot 234. Aperture 252 is provided with the appropriate structure, for example the cruciform structure of FIG. 8E. Focusing mechanism 210 is shown including two lenses 212 and 214. Focusing mechanism 211 is shown including two lenses 213 and 215. Preferably, lenses 212, 213, 214 and 215 all are axicon lenses to take advantage of the enhanced focal depth of that type of lens.

Preferably, light source 200 is an incoherent light source such as a light emitting diode or a low coherency diode laser having a large spectral width (and therefore being multichromatic). It is preferable that the image of spot 234 be laterally uniform. If a monochromatic coherent source is used, the image of spot 234 tends to have a speckle pattern because of interference between different rays reflected from workpiece 232.

While the invention has been described with respect to a limited number of embodiments, it will be appreciated that many variations modifications and other applications of the invention may be made.

What is claimed is:

1. A device for measuring a distance to a workpiece, comprising:
   (a) a mechanism for creating an illuminated spot on the workpiece, said illuminated spot emitting diffusely reflected light;
   (b) a two dimensional detector array, said diffusely reflected light traversing an optical path form the workpiece to said two dimensional detector array; and
   (c) an optical system, for intercepting at least a portion of said diffusely reflected light and focusing substantially all of said intercepted light on said two dimensional detector array as an annular image, said optical system including:
      (i) an axis of symmetry
      (ii) at least one lens, substantially concentric with said axis of symmetry, and
      (iii) a mechanism, for folding said optical path, substantially concentric with said axis of symmetry.

2. The device of claim 1, wherein said two dimensional detector array is a change coupled device array.

3. The device of claim 1, wherein at least one of said at least one lens is toroidal.

4. The device of claim 1, wherein said mechanism for folding said optical path includes a conical mirror.

5. The device of claim 1, wherein said at least one lens is spherical.

6. A method for measuring the dimensions of a cavity of a workpiece, the cavity being bounded by at least one wall, the method comprising the steps of:
   (a) inserting a single reflector into the cavity;
   (b) directing an incident beam of light at said single reflector, thereby providing a reflected beam of light directed at the wall, said reflected light being further reflected from a spot having a position on the wall back to said single reflector, and from said single reflector out of said cavity;
   (c) intercepting said reflected light at an interception point having a position outside of the cavity; and
   (d) inferring said position of said spot by tracing a ray backwards from said interception point to an intersection of said ray with said reflected beam.

7. The method of claim 6, further comprising the step of scanning said wall.

8. The method of claim 7, wherein said scanning is effected by moving said reflector.

9. The method of claim 8, wherein said scanning is effected by translating said reflector substantially parallel to said incident beam.

10. The method of claim 8, wherein said scanning is effected by rotating said reflector about an axis substantially parallel to said incident beam.

11. The method of claim 8, wherein said scanning is effected by rotating said reflector about an axis substantially perpendicular to said incident beam.

12. The method of claim 7, wherein said scanning is effected by moving the workpiece.

13. The method of claim 12, wherein said scanning is effected by translating the workpiece substantially parallel to said incident beam.

14. The method of claim 12, wherein said scanning is effected by rotating the workpiece about an axis substantially parallel to said incident beam.

15. A method for measuring the dimensions of a cavity of a workpiece, the cavity being bound by at least one wall, the method comprising the steps of:
   (a) inserting a reflector into the cavity;
   (b) directing an incident beam of light at said reflector, thereby providing a reflected beam of light directed at the wall, said reflected light being further reflected from a spot having a position on the wall back to said reflector, and from said reflector out of said cavity;
   (c) scanning said wall by rotating said reflector about an axis substantially perpendicular to said incident beam;
   (d) intercepting said reflected light at an interception point having a position outside of the cavity; and
   (e) inferring said position of said spot.

16. A method for measuring the dimensions of a cavity of a workpiece, the cavity being bounded by at least one wall, the method comprising the steps of:
   (a) inserting a reflector into the cavity;
   (b) directing an incident beam of light at said reflector, thereby providing a reflected beam of light directed at the wall, said reflected light being diffusely reflected from a spot having a position on the wall back to said reflector, and further reflected from said reflector out of said cavity;
   (c) intercepting said diffusely reflected light at an interception point having a position outside of the cavity; and
   (d) inferring said position of said spot by tracing a ray backwards from said interception point to an intersection of said ray with said reflected beam.

17. The method of claim 16, further comprising the step of scanning said wall.

18. The method of claim 17, wherein said scanning is effected by moving said reflector.

19. The method of claim 18, wherein said scanning is effected by translating said reflector substantially parallel to said incident beam.

20. The method of claim 18, wherein said scanning is effected by rotating said reflector about an axis substantially parallel to said incident beam.

21. A method for measuring the dimensions of a cavity of a workpiece, the cavity being bounded by at least one wall, the method comprising the steps of:

(a) inserting a reflector into the cavity;

(b) directing an incident beam of light at said reflector, thereby providing a reflected beam of light directed at the wall, said reflected light being further reflected from a spot having a position on the wall back to said reflector, and from said reflector out of said cavity;

(c) scanning the wall by moving said reflector;

(d) intercepting said reflected light using a focusing optical system that remains entirely outside of the cavity during said scanning of the wall; and (e) inferring said position of said spot by tracing a ray backwards from said interception point to an intersection of said ray with said reflected beam.

22. The method of claim 21, wherein said scanning is effected by translating said reflector substantially parallel to said incident beam.

23. The method of claim 21, wherein said scanning is effected by rotating said reflector about an axis substantially parallel to said incident beam.

* * * * *

UNITED STATES PATENT AND TRADEMARK OFFICE
CERTIFICATE OF CORRECTION

PATENT NO : 5,978,089
DATED : Nov. 2, 1999
INVENTOR(S) : Gabi Horovitz

It is certified that error appears in the above-identified patent and that said Letters Patent is hereby corrected as shown below:

On title page, item [73] should read as follows:

- on Title Page, Assignee: Nextec, Ltd., Haifa, Israel

Signed and Sealed this

Eighth Day of May, 2001

*Attest:*

NICHOLAS P. GODICI

*Attesting Officer*     *Acting Director of the United States Patent and Trademark Office*